United States Patent
Carvalho et al.

(10) Patent No.: US 11,029,328 B2
(45) Date of Patent: Jun. 8, 2021

(54) SMARTPHONE MOTION CLASSIFIER

(71) Applicant: QUALCOMM Incorporated, San Diego, CA (US)

(72) Inventors: Vitor Carvalho, San Diego, CA (US); Bhuwan Dhingra, San Diego, CA (US); Edward Harrison Teague, San Diego, CA (US); Siddika Parlak Polatkan, Belmont, CA (US); Shankar Sadasivam, San Diego, CA (US); Carlos Manuel Puig, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1198 days.

(21) Appl. No.: 14/865,665

(22) Filed: Sep. 25, 2015

(65) Prior Publication Data

US 2016/0195569 A1    Jul. 7, 2016

Related U.S. Application Data

(60) Provisional application No. 62/100,807, filed on Jan. 7, 2015.

(51) Int. Cl.
*G01P 15/18* (2013.01)
*H04W 4/02* (2018.01)
*G06F 3/0346* (2013.01)

(52) U.S. Cl.
CPC ........... *G01P 15/18* (2013.01); *G06F 3/0346* (2013.01); *H04W 4/026* (2013.01); *H04W 4/027* (2013.01)

(58) Field of Classification Search
None
See application file for complete search history.

(56) References Cited

U.S. PATENT DOCUMENTS

| | | |
|---|---|---|
| 8,983,412 B2 | 3/2015 | Featherstone et al. |
| 2009/0319221 A1 | 12/2009 | Kahn et al. |
| 2012/0299828 A1 | 11/2012 | Grokop et al. |
| 2013/0245986 A1 | 9/2013 | Grokop et al. |

(Continued)

FOREIGN PATENT DOCUMENTS

| | | |
|---|---|---|
| JP | 2011525414 A | 9/2011 |
| WO | 2011083572 A1 | 7/2011 |

(Continued)

OTHER PUBLICATIONS

International Search Report and Written Opinion—PCT/US2015/067173 ISA/EPO—dated Mar. 22, 2016.

*Primary Examiner* — Abul Kalam
(74) *Attorney, Agent, or Firm* — Thien T. Nguyen

(57) ABSTRACT

Disclosed is an apparatus and method for classifying a motion state of a mobile device comprising: determining a first motion state associated with a highest probability value and with a first confidence level greater than a first threshold; entering the first motion state; while the first motion state is active, determining a second motion state associated with a highest probability value and with a second confidence level greater than the first threshold, the second motion state being different from the first motion state; determining whether the second motion state is to be entered; and in response to determining that the second motion state is to be entered, entering the second motion state.

28 Claims, 4 Drawing Sheets

(56) References Cited

U.S. PATENT DOCUMENTS

| | | |
|---|---|---|
| 2014/0071046 A1 | 3/2014 | Mucignat et al. |
| 2014/0167973 A1 | 6/2014 | Letchner et al. |
| 2014/0247206 A1 | 9/2014 | Grokop et al. |
| 2015/0045021 A1 | 2/2015 | Schlatter et al. |
| 2015/0087264 A1 | 3/2015 | Goyal |
| 2016/0029224 A1* | 1/2016 | Edge .................... G01S 5/0252 455/456.1 |

FOREIGN PATENT DOCUMENTS

| | | |
|---|---|---|
| WO | 2013040493 A1 | 3/2013 |
| WO | 2013157332 A1 | 10/2013 |
| WO | 2014147785 A1 | 9/2014 |
| WO | 2014209697 A1 | 12/2014 |

* cited by examiner

SMARTPHONE MOTION CLASSIFIER

CROSS-REFERENCE TO RELATED APPLICATIONS

This application claims the benefit of U.S. Provisional Application Ser. No. 62/100,807, filed on Jan. 7, 2015, which application is incorporated herein by reference in its entirety.

FIELD

The subject matter disclosed herein relates generally to motion and activity classification using sensors on a mobile device.

BACKGROUND

Classifying physical motion states of a mobile device is useful for various applications. Such applications may include motion-aided geo-fencing, motion-aided Wi-Fi scan optimization, distracted pedestrian detection, health monitoring, etc. Common motion states may include walking, running, biking, traveling in a motor vehicle, and being stationary, etc.

SUMMARY

In one embodiment, disclosed is a method for classifying a motion state of a mobile device comprising: determining a first motion state associated with a highest probability value and with a first confidence level greater than a first threshold; entering the first motion state; while the first motion state is active, determining a second motion state associated with a highest probability value and with a second confidence level greater than the first threshold, the second motion state being different from the first motion state; determining whether the second motion state is to be entered; and in response to determining that the second motion state is to be entered, entering the second motion state.

In another embodiment, disclosed is a mobile device comprising: a memory; and a processor coupled to the memory, the processor to: determine a first motion state associated with a highest probability value and with a first confidence level greater than a first threshold, enter the first motion state, while the first motion state is active, determine a second motion state associated with a highest probability value and with a second confidence level greater than the first threshold, the second motion state being different from the first motion state, determine whether the second motion state is to be entered, and in response to determining that the second motion state is to be entered, enter the second motion state.

In yet another embodiment, disclosed is a mobile device comprising: means for determining a first motion state associated with a highest probability value and with a first confidence level greater than a first threshold; means for entering the first motion state; means for while the first motion state is active, determining a second motion state associated with a highest probability value and with a second confidence level greater than the first threshold, the second motion state being different from the first motion state; means for determining whether the second motion state is to be entered; and means for in response to determining that the second motion state is to be entered, entering the second motion state.

In still another embodiment, disclosed is a non-transitory computer-readable medium comprising code which, when executed by a processor of a mobile device, causes the processor to perform a function comprising: determining a first motion state associated with a highest probability value and with a first confidence level greater than a first threshold; entering the first motion state; while the first motion state is active, determining a second motion state associated with a highest probability value and with a second confidence level greater than the first threshold, the second motion state being different from the first motion state; determining whether the second motion state is to be entered; and in response to determining that the second motion state is to be entered, entering the second motion state.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
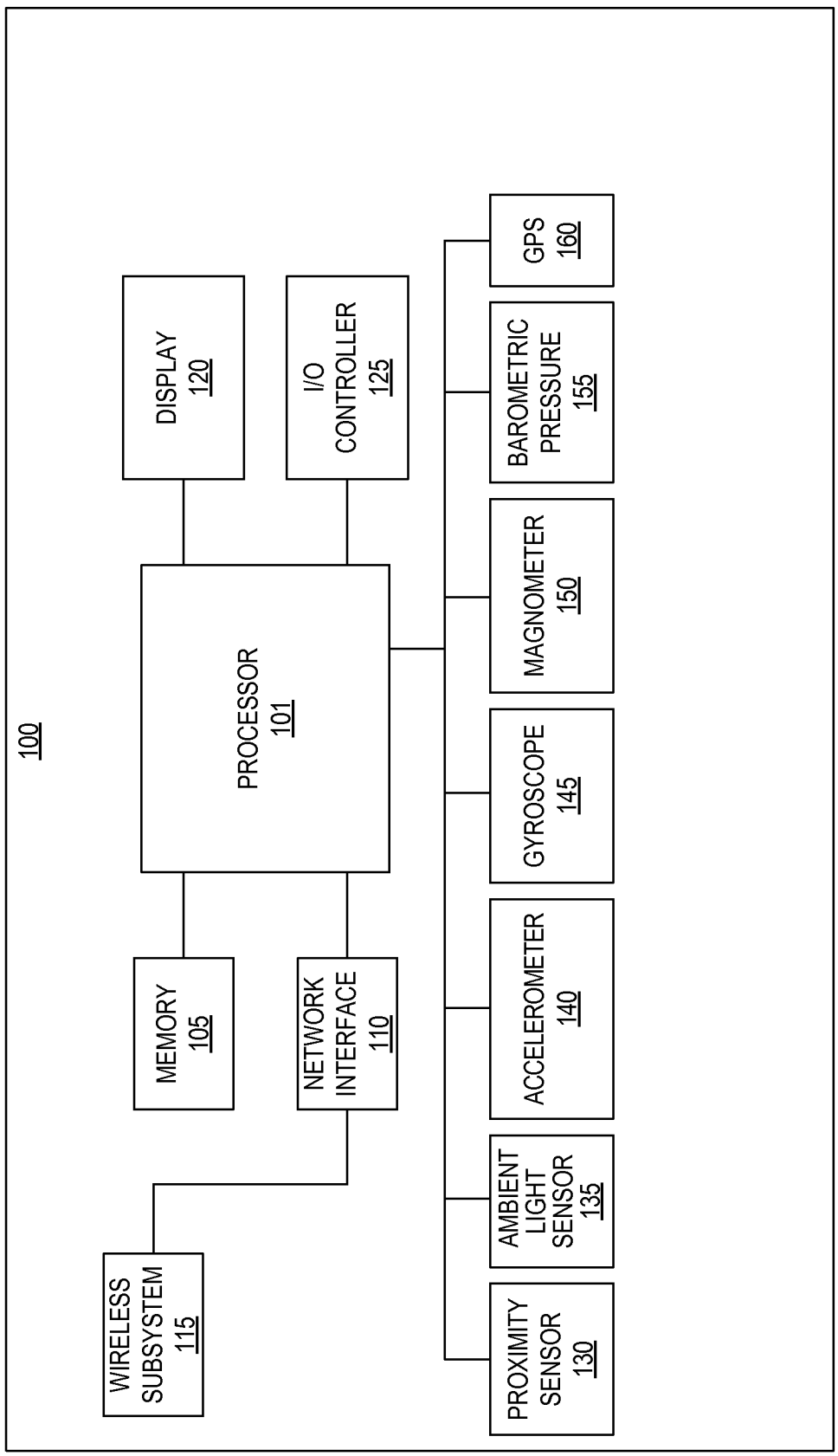
FIG. 1 is a block diagram of a device in which aspects of the disclosure may be practiced.

FIG. 1 is block diagram illustrating an exemplary device 100 in which embodiments of the disclosure may be practiced. The device 100 may be a mobile device, which may include one or more processors 101, a memory 105, I/O controller 125, and network interface 110. Thus, the device 100 may be a: mobile device, wireless device, cell phone, personal digital assistant, mobile computer, tablet, head-mounted display (HMD), wearable device, personal computer, laptop computer, or any type of device that has processing capabilities. Device may also include one or more sensors (e.g., a proximity sensor, ambient light sensor (ALS), accelerometer, gyroscope, magnetometer, barometric pressure sensor, Global Positioning System (GPS) sensor) coupled to one or more buses or signal lines further coupled to the processor 101. It should be appreciated that device may also include a display 120, a user interface (e.g., keyboard, touch-screen, or similar devices), a power device (e.g., a battery), as well as other components typically associated with electronic devices. In some embodiments, device 100 may be a mobile device. Network interface 110 may also be coupled to a number of wireless subsystems 115 (e.g., Bluetooth, Wi-Fi, Cellular, or other networks) to transmit and receive data streams through a wireless link to/from a wireless network, or may be a wired interface for direct connection to networks (e.g., the Internet, Ethernet, or other wireless systems).

Device 100 can include sensors such as a proximity sensor 130, ambient light sensor (ALS) 135, accelerometer 140, gyroscope 145, magnetometer 150, barometric pressure sensor 155, and/or Global Positioning Sensor (GPS) 160.

Memory 105 may be coupled to processor 101 to store instructions for execution by processor 101. In some embodiments, memory 105 is non-transitory. Memory 105 may also store one or more models or modules to implement embodiments described below. Memory 105 may also store data from integrated or external sensors.

It should be appreciated that embodiments of the disclosure as will be hereinafter described may be implemented through the execution of instructions, for example as stored in the memory 105 or other element, by processor 101 of device 100 and/or other circuitry of device and/or other devices. Particularly, circuitry of device, including but not limited to processor 101, may operate under the control of a program, routine, or the execution of instructions to execute methods or processes in accordance with embodiments of the disclosure. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device 100 itself and/or some or all of the functions, engines or modules described herein may be performed by another system or device connected through I/O controller 125 or network interface 110 (wirelessly or wired) to device. Thus, some and/or all of the functions may be performed by another system and the results or intermediate calculations may be transferred back to device. In some embodiments, such other device may comprise a server configured to process information in real time or near real time.

Figure 2:
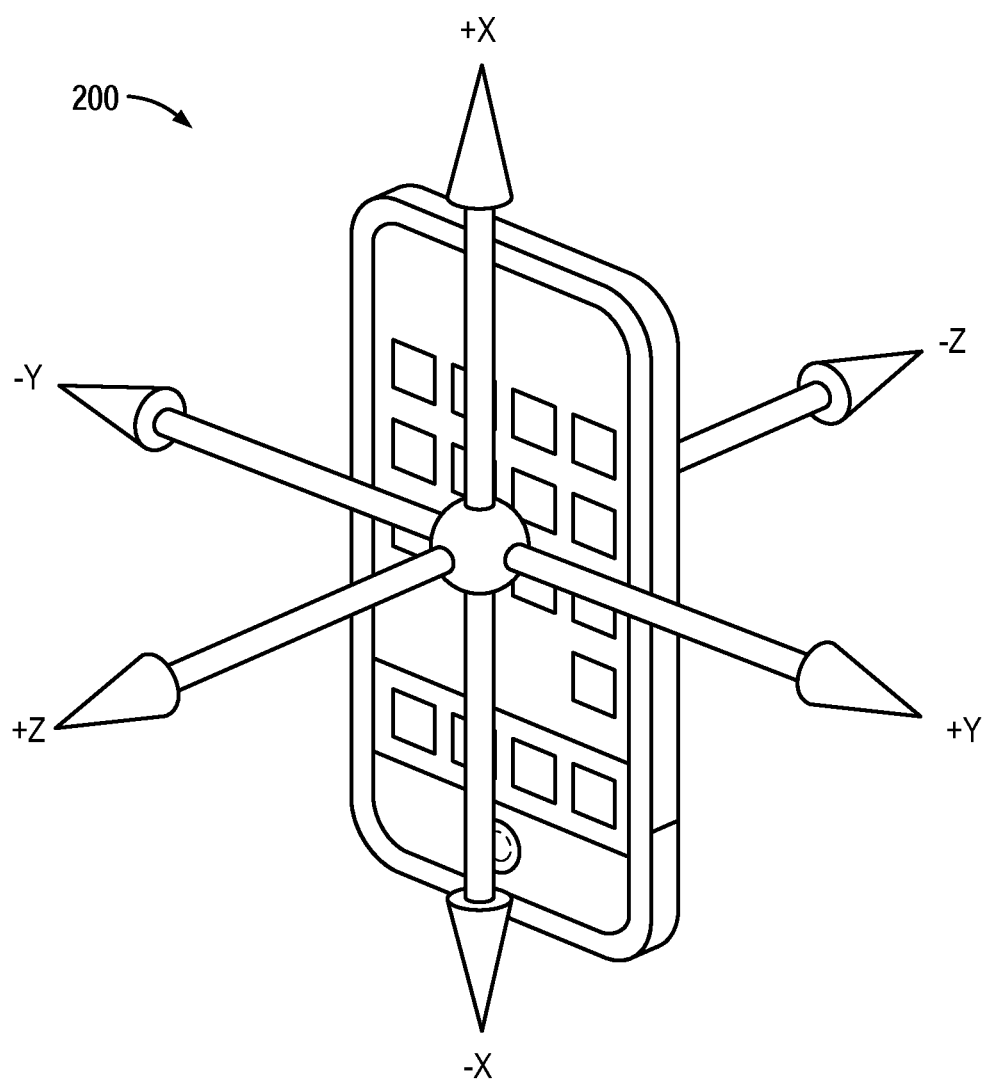
FIG. 2 illustrates a coordinate system of an accelerometer included in a device.

FIG. 2 illustrates an example coordinate system 200 of an example accelerometer 140 included in an example device 100. The x, y, and z axes run along the height, width, and depth of the device 100, respectively. The accelerometer 140 samples and outputs in real time data representing magnitude and direction of acceleration components along each of the orthogonal x, y, and z axes.

Embodiments of the disclosure are related to techniques for classifying a motion state of a mobile device based on triaxial accelerometer sensor data. Various statistical techniques may be employed in order to provide a motion state estimate of a mobile device that is as accurate as possible. Methods for estimating motion states based on accelerometer sensor data are known in the art. Embodiments of the disclosure may report motion state entry and exit events. A timestamp may be associated with an entry or exit event. A motion state entry event may indicate that a particular motion state is recognized as being the current motion state of the mobile device, while a motion state exit event may indicate that a particular motion state is recognized as ceasing to be the current motion state of the mobile device. The recognized current motion state may be hereinafter referred to as the active motion state.

Probabilities for the following five motion states may be generated: 1) Stationary state (indicating that the mobile device is stationary), 2) Walk state (indicating that a user carrying the mobile device is walking), 3) Run state (indicating that a user carrying the mobile device is running), 4) Biking state (indicating that a user carrying the mobile device is biking), and 5) InMotorTransit state (indicating that a user carrying the mobile device is traveling in a moving motor vehicle or that the mobile device is being carried in a moving motor vehicle). A sixth Unknown state may be generated when the confidence level for the most probable motion state among the five above-described states is not sufficiently high. Moreover, the Biking state and the Stationary state can be simultaneously active to indicate that a biking user carrying the mobile device is temporarily stationary. The simultaneously active Biking and Stationary states may be generated when, for example, a user on a bike stops at a traffic light and is temporarily stationary. Similarly, the InMotorTransit state and the Stationary state can be simultaneously active to indicate that a user traveling in a moving motor vehicle and carrying the mobile device is temporarily stationary. Of course, the disclosure may be adapted to accommodate additional motion states not described above.

Figure 3:
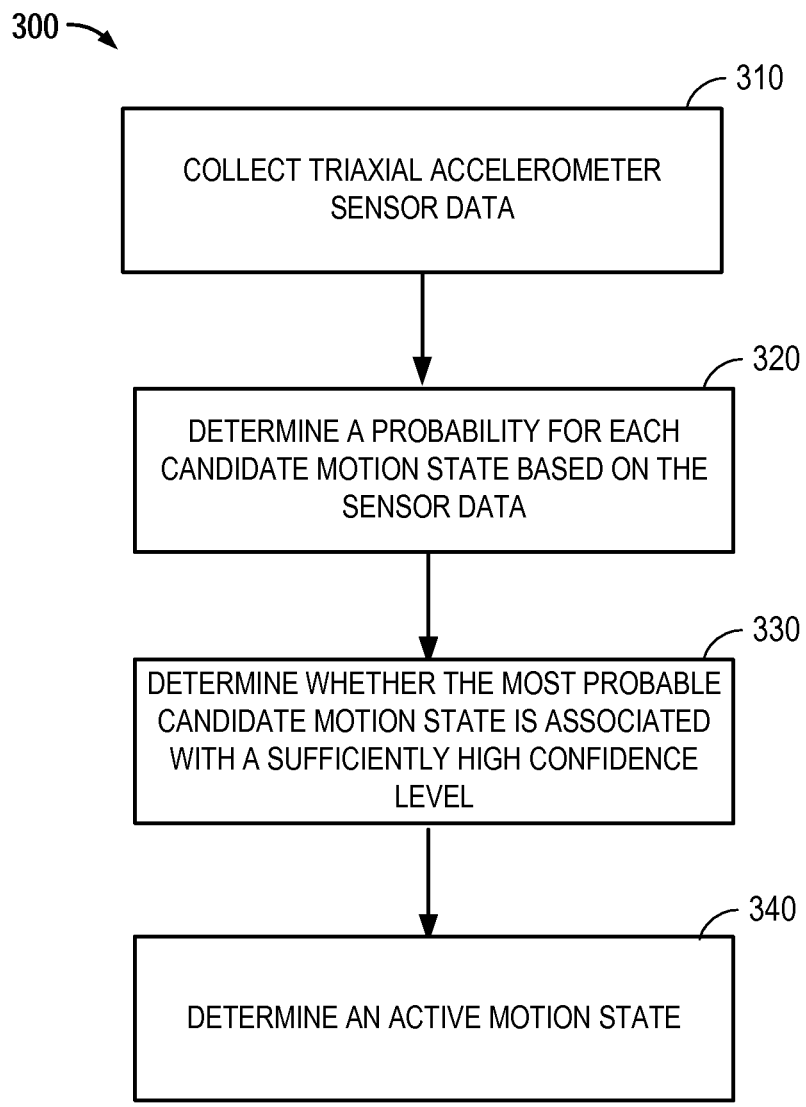
FIG. 3 illustrates a flowchart of a method for classifying a motion state of a mobile device.

Referring to FIG. 3, a flowchart illustrating an exemplary method 300 for classifying a motion state of a mobile device 100 is shown. At block 310, triaxial accelerometer sensor data may be collected from a triaxial accelerometer 140. At block 320, a probability may be determined for each candidate motion state based on the triaxial accelerometer data. For example, a probability may be determined for each of the five motion states described above (Stationary, Walk, Run, Biking, and InMotorTransit). Statistical modeling techniques, such as Gaussian mixture models (GMM) or linear regression, may be utilized in the determination of the probabilities. At block 330, whether or not a confidence level associated with the most probable candidate motion state as determined at block 320 is sufficiently high may be determined The confidence level associated with the most probable candidate motion state may be determined based on the difference in probabilities between the most probable candidate motion state and the second most probable candidate motion state. The greater the difference, the higher the confidence level. The confidence level associated with the most probable candidate motion state is sufficiently high when it is above a first predetermined threshold. In other words, the confidence level associated with the most probable candidate motion state is sufficiently high when the difference in probabilities between the most probable candidate motion state and the second most probable candidate motion state is greater than a predetermined threshold. It should be appreciated that the result of block 330 may be discarded under certain circumstances when the most probable candidate motion state is Biking or InMotorTransit. At block 340, a motion state may be determined as an active motion state. Thus, the determined motion state may be entered. In one embodiment, if the confidence level as determined at block 330 is sufficiently high, the most probable candidate motion state as determined at block 320 is selected as the active motion state; on the other hand, if the confidence level as determined at block 330 is not sufficiently high, an Unknown state may be determined as the active motion state.

In some embodiments, time-based restrictions may be placed on motion state transitions to help reduce motion state toggling in the outputted active motion state. Therefore, when the confidence level associated with the most probable candidate motion state as determined at block 320 is sufficiently high for the purposes of block 330 (e.g., the confidence level is above the first predetermined threshold) but is not greater than a second predetermined threshold that is higher than the first threshold, and the most probable candidate motion state is different from the currently active motion state, the transition in motion state may be delayed until the new most probable candidate motion state remains the most probable (as determined at block 320) with a sufficiently high confidence level (e.g., greater than the first predetermined threshold, as determined at block 330) continuously for a predetermined period of time. Otherwise, no transition in motion state is performed. On the other hand, if the confidence level associated with the most probable candidate motion state is greater than the second predetermined threshold (which is greater than the first predetermined threshold), and the most probable candidate motion state is different from the currently active motion state, the transition may be performed immediately. In other words, in order to reduce motion state toggling, the transition in the active motion state may be delayed based on the confidence level associated with the most probable candidate motion state as determined at blocks 320 and 330.

In some embodiments, the active motion states of Biking or InMotorTransit may remain active when a Stationary motion state becomes active to account for such scenarios as when the bike/motor vehicle the user carrying the mobile device is traveling on (in) stops temporarily, for example, at a traffic light. In other words, the Biking state and the Stationary state can be simultaneously active. Similarly, the InMotorTransit state and the Stationary state can also be simultaneously active. When the bike/motor vehicle stops, the motion state transition into the Stationary state is registered, but at the same time the Biking/InMotorTransit motion state may be kept active. The length of time period the Biking/InMotorTransit motion state is kept active simultaneously with the Stationary motion state may be dependent upon the length of time period the Biking/InMotorTransit motion state has been active before the Stationary motion state is entered: the longer the Biking/InMotorTransit motion state has been active before the Stationary motion state becomes active, the longer the Biking/InMotorTransit motion state may be kept active after the Stationary motion state is entered. A predetermined maximum persistence time may provide an upper bound on the length of time period the Biking/InMotorTransit motion state is kept active after the Stationary motion state becomes active. The maximum persistence time may, in some embodiments, be 30 seconds, 1 minute, 2 minutes, 3 minutes, 4 minutes, 5 minutes, 10 minutes, etc.

In addition to the examples described above, other combinations of motion states that can be simultaneously active are also possible. Examples may include the combinations of Walk and Stationary, of Run and Stationary, of InMotorVehicle and Walk, or of Walk and Run, etc.

Certain applications such as geo-fencing and life-logging applications may require accurate logs of events. Therefore, a secondary timestamp, which may be referred to as a predating timestamp, may be associated with motion state entry/exit events and provided to the applications to account for the timestamp inaccuracies caused by the artificially introduced delays in motion state transitioning and in exiting Biking/InMotorTransit motion state, as described above.

Figure 4:
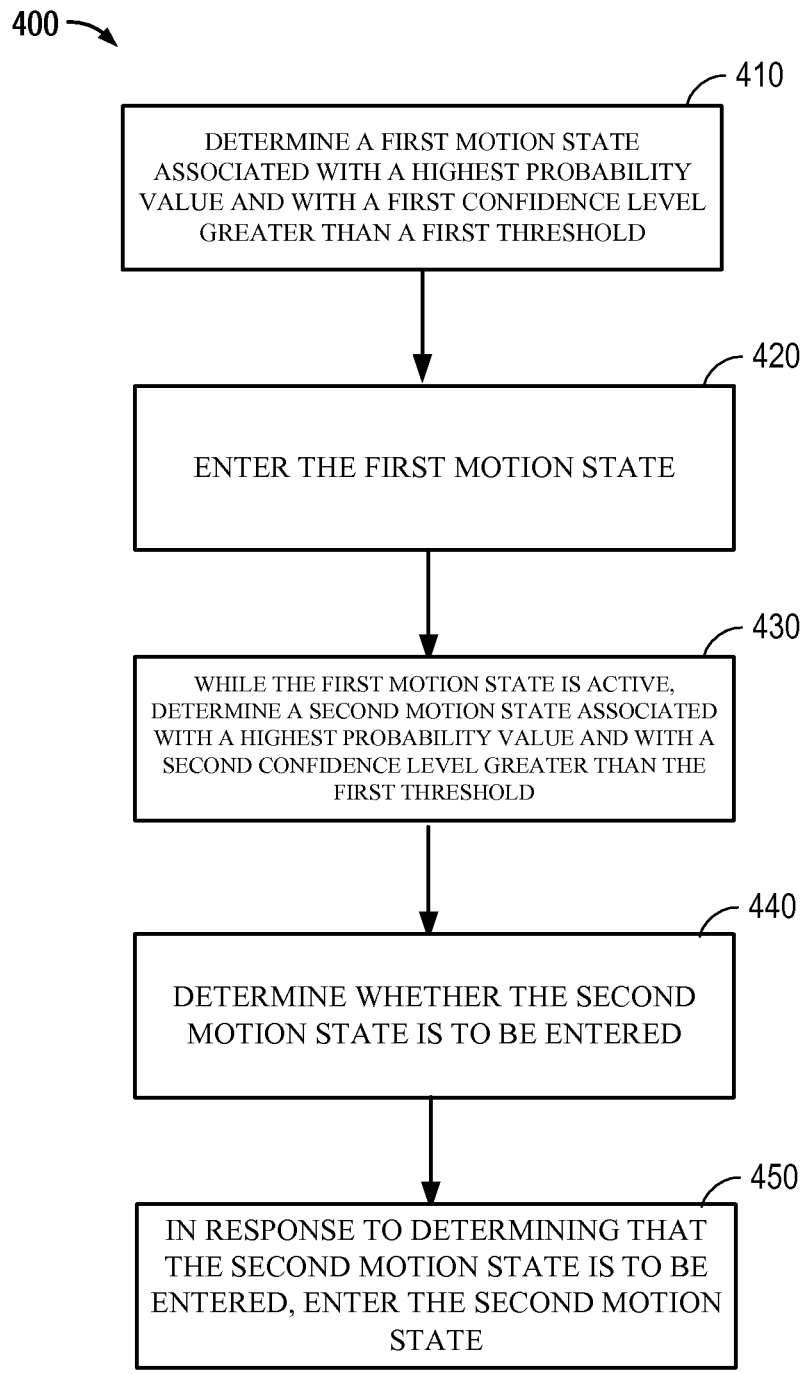
FIG. 4 illustrates a flowchart of a method for classifying a motion state of a mobile device.

Referring to FIG. 4, a flowchart illustrating an exemplary method 400 for classifying a motion state of a mobile device 100 is shown. At block 410, a first motion state associated with a highest probability value and with a first confidence level that is greater than a first predetermined threshold may be determined. At block 420, the first motion state may be entered. At block 430, while the first motion state is active, a second motion state associated with a highest probability value and with a second confidence level that is greater than the first threshold may be determined, where the second motion state is different from the first motion state. At block 440, whether the second motion state is to be entered may be determined. The second motion state is to be entered when one of the following applies: 1) the second confidence level is greater than a second predetermined threshold, where the second threshold is greater than the first threshold, or 2) while the first motion state is active, the second motion state is associated with a highest probability value and with confidence levels greater than the first threshold but less than the second threshold continuously for a predetermined time period. At block 450, in response to determining that the second motion state is to be entered, the second motion state may be entered. It should be appreciated that a confidence level associated with a motion state associated with a highest probability value may be determined based on a difference between the highest probability value and a probability value associated with a motion state associated with a second highest probability value. The greater the difference, the higher the confidence level.

Furthermore, in response to determining that the second motion state is to be entered, whether the first motion state is to persist after the second motion state is entered may be determined. When first and second motion states can be simultaneously active (Biking and Stationary, InMotorTransit and Stationary, etc.), as described in detail above, it may be determined that the first motion state is to persist after the second motion state is entered. In response to determining that the first motion state is not to persist, the first motion state may exit when the second motion state is entered. On the other hand, in response to determining that the first motion state is to persist, a persistence time period by which the first motion state is to persist after the second motion state is entered may be determined, and exiting of the first motion state may be delayed by the persistence time period after the second motion state is entered. The persistence time period may be determined based on a time period for which the first motion state has been active when the second motion state becomes associated with a highest probability value and with the second confidence level that is greater than the first threshold.

Moreover, a time instant when the second motion state becomes associated with a highest probability value and with the second confidence level that is greater than the first threshold may be determined (e.g., a timestamp), and the time instant may be provided to applications to which it may be useful. It should be noted that an UNKNOWN motion state may be entered in response to determining a third motion state associated with a highest probability value and with a third confidence level less than the first threshold.

In one embodiment of the disclosure, a mobile device may comprise: a memory; and a processor coupled to the memory, the processor to: determine a first motion state associated with a highest probability value and with a first confidence level greater than a first threshold, enter the first motion state, while the first motion state is active, determine a second motion state associated with a highest probability value and with a second confidence level greater than the first threshold, the second motion state being different from the first motion state, determine whether the second motion state is to be entered, and in response to determining that the second motion state is to be entered, enter the second motion state.

Therefore, embodiments of the disclosure are related to methods for classifying a motion state of a mobile device comprising collecting triaxial accelerometer sensor data, determining probabilities for candidate motion states based on the sensor data with statistical techniques, determining a confidence level associated with the most probable candidate motion state, and determining an active motion state. Transitions in motion states may be delayed in order to reduce motion state toggling. Moreover, two motion states can be simultaneously active to account for such scenarios as when the bike/motor vehicle the user carrying the mobile device is traveling on (in) stops at a traffic light. A predating timestamp may be associated with motion state entry/exit events to provide accurate timing information to applications that require strict timing information accuracy levels.

It should be appreciated that aspects of the disclosure previously described may be implemented in conjunction with the execution of instructions (e.g., applications) by processor 101 of device 100, as previously described. Particularly, circuitry of the device, including but not limited to processor, may operate under the control of an application, program, routine, or the execution of instructions to execute methods or processes in accordance with embodiments of the disclosure (e.g., the processes of FIGS. 3 and 4). For example, such a program may be implemented in firmware or software (e.g., stored in memory and/or other locations) and may be implemented by processors and/or other circuitry of the devices. Further, it should be appreciated that the terms processor, microprocessor, circuitry, controller, etc., refer to any type of logic or circuitry capable of executing logic, commands, instructions, software, firmware, functionality, etc.

It should be appreciated that when the device is a mobile or wireless device that it may communicate via one or more wireless communication links through a wireless network that are based on or otherwise support any suitable wireless communication technology. For example, in some aspects computing device or server may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, 3G, LTE, LTE Advanced, 4G, and Wi-Fi. Similarly, a wireless device may support or otherwise use one or more of a variety of corresponding modulation or multiplexing schemes. A mobile wireless device may wirelessly communicate with other mobile devices, cell phones, other wired and wireless computers, Internet web-sites, etc.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an Electrocardiography (EKG) device, etc.), a user I/O device, a computer, a server, a point-of-sale device, an entertainment device, a set-top box, or any other suitable device. These devices may have different power and data requirements and may result in different power profiles generated for each feature or set of features.

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for classifying a motion state of a mobile device comprising:
   determining a first motion state associated with a highest probability value and with a first confidence level;
   entering the first motion state;
   while the first motion state is active, determining a second motion state associated with a highest probability value and with a second confidence level, the second motion state being different from the first motion state, wherein a confidence level of a motion state, associated with a highest probability value, is greater than a first threshold, and is determined based on a difference between the highest probability value and a probability value associated with a motion state with a second highest probability value;
   determining whether the second motion state is to be entered; and
   in response to determining that the second motion state is to be entered, entering the second motion state.

2. The method of claim 1, wherein the second motion state is to be entered when 1) the second confidence level is greater than a second threshold, the second threshold being greater than the first threshold, or 2) while the first motion state is active, the second motion state is associated with a highest probability value and with confidence levels greater than the first threshold but less than the second threshold continuously for a predetermined time period.

3. The method of claim 1, further comprising:
   in response to determining that the second motion state is to be entered, determining whether the first motion state is to persist after the second motion state is entered;
   in response to determining that the first motion state is not to persist, exiting the first motion state when the second motion state is entered; and in response to determining that the first motion state is to persist, 1) determining a persistence time period by which the first motion state is to persist after the second motion state is entered, and 2) delaying exiting the first motion state by the persistence time period after the second motion state is entered.

4. The method of claim 3, wherein the first motion state is to persist when the first motion state indicates a user carrying the mobile device is walking or running, and the second motion state is a stationary state.

5. The method of claim 3, wherein the first motion state is to persist when the first motion state indicates the mobile device is being carried in a moving motor vehicle or by a user who is biking, and the second motion state is a stationary state.

6. The method of claim 3, wherein the persistence time period is determined based on a time period for which the first motion state has been active when the second motion state becomes associated with a highest probability value and with the second confidence level greater than the first threshold.

7. The method of claim 1, further comprising:
   determining a time instant when the second motion state becomes associated with a highest probability value and with the second confidence level greater than the first threshold; and
   reporting the time instant.

8. The method of claim 1, further comprising:
   entering an UNKNOWN motion state in response to determining a third motion state associated with a highest probability value and with a third confidence level less than the first threshold.

9. The method of claim 1, wherein each of the first and second motion states indicates one of: 1) the mobile device is stationary, 2) a user carrying the mobile device is walking, 3) the user carrying the mobile device is running, 4) the user carrying the mobile device is biking, or 5) the user carrying the mobile device is traveling in a moving motor vehicle.

10. A mobile device comprising:
    a memory; and
    a processor coupled to the memory, the processor to:
    determine a first motion state associated with a highest probability value and with a first confidence level,
    enter the first motion state,
    while the first motion state is active, determine a second motion state associated with a highest probability value and with a second confidence level, the second motion state being different from the first motion state, wherein a confidence level of a motion state, associated with a highest probability value, is greater than a first threshold, and is determined based on a difference between the highest probability value and a probability value associated with a motion state with a second highest probability value,
    determine whether the second motion state is to be entered, and
    in response to determining that the second motion state is to be entered, enter the second motion state.

11. The mobile device of claim 10, wherein the second motion state is to be entered when 1) the second confidence level is greater than a second threshold, the second threshold being greater than the first threshold, or 2) while the first motion state is active, the second motion state is associated with a highest probability value and with confidence levels greater than the first threshold but less than the second threshold continuously for a predetermined time period.

12. The mobile device of claim 10, wherein the processor is further to:
  in response to determining that the second motion state is to be entered, determine whether the first motion state is to persist after the second motion state is entered,
  in response to determining that the first motion state is not to persist, exit the first motion state when the second motion state is entered; and
  in response to determining that the first motion state is to persist, 1) determine a persistence time period by which the first motion state is to persist after the second motion state is entered, and 2) delay exiting the first motion state by the persistence time period after the second motion state is entered.

13. The mobile device of claim 12, wherein the first motion state is to persist when the first motion state indicates a user carrying the mobile device is walking or running, and the second motion state is a stationary state.

14. The mobile device of claim 12, wherein the first motion state is to persist when the first motion state indicates the mobile device is being carried in a moving motor vehicle or by a user who is biking, and the second motion state is a stationary state.

15. The mobile device of claim 12, wherein the persistence time period is determined based on a time period for which the first motion state has been active when the second motion state becomes associated with a highest probability value and with the second confidence level greater than the first threshold.

16. The mobile device of claim 10, wherein the processor is further to:
  determine a time instant when the second motion state becomes associated with a highest probability value and with the second confidence level greater than the first threshold; and
  report the time instant.

17. The mobile device of claim 10, wherein the processor is further to:
  enter an UNKNOWN motion state in response to determining a third motion state associated with a highest probability value and with a third confidence level less than the first threshold.

18. The mobile device of claim 10, wherein each of the first and second motion states indicates one of: 1) the mobile device is stationary, 2) a user carrying the mobile device is walking, 3) the user carrying the mobile device is running, 4) the user carrying the mobile device is biking, or 5) the user carrying the mobile device is traveling in a moving motor vehicle.

19. A mobile device comprising:
  means for determining a first motion state associated with a highest probability value and with a first confidence level;
  means for entering the first motion state;
  means for while the first motion state is active, determining a second motion state associated with a highest probability value and with a second confidence level, the second motion state being different from the first motion state, wherein a confidence level of a motion state, associated with a highest probability value, is greater than a first threshold, and is determined based on a difference between the highest probability value and a probability value associated with a motion state with a second highest probability value;
  means for determining whether the second motion state is to be entered; and
  means for in response to determining that the second motion state is to be entered, entering the second motion state.

20. The mobile device of claim 19, wherein the second motion state is to be entered when 1) the second confidence level is greater than a second threshold, the second threshold being greater than the first threshold, or 2) while the first motion state is active, the second motion state is associated with a highest probability value and with confidence levels greater than the first threshold but less than the second threshold continuously for a predetermined time period.

21. The mobile device of claim 19, further comprising:
  means for in response to determining that the second motion state is to be entered, determining whether the first motion state is to persist after the second motion state is entered;
  means for in response to determining that the first motion state is not to persist, exiting the first motion state when the second motion state is entered; and
  means for in response to determining that the first motion state is to persist, 1) determining a persistence time period by which the first motion state is to persist after the second motion state is entered, and 2) delaying exiting the first motion state by the persistence time period after the second motion state is entered.

22. The mobile device of claim 21, wherein the first motion state is to persist when the first motion state indicates a user carrying the mobile device is walking or running, and the second motion state is a stationary state.

23. The mobile device of claim 21, wherein the first motion state is to persist when the first motion state indicates the mobile device is being carried in a moving motor vehicle or by a user who is biking, and the second motion state is a stationary state.

24. A non-transitory computer-readable medium comprising code which, when executed by a processor of a mobile device, causes the processor to perform a function comprising:
  determining a first motion state associated with a highest probability value and with a first confidence level;
  entering the first motion state;
  while the first motion state is active, determining a second motion state associated with a highest probability value and with a second confidence level, the second motion state being different from the first motion state, wherein a confidence level of a motion state, associated with a highest probability value, is greater than a first threshold, and is determined based on a difference between the highest probability value and a probability value associated with a motion state with a second highest probability value;
  determining whether the second motion state is to be entered; and
  in response to determining that the second motion state is to be entered, entering the second motion state.

25. The non-transitory computer-readable medium of claim 24, wherein the second motion state is to be entered when 1) the second confidence level is greater than a second threshold, the second threshold being greater than the first threshold, or 2) while the first motion state is active, the second motion state is associated with a highest probability value and with confidence levels greater than the first threshold but less than the second threshold continuously for a predetermined time period.

26. The non-transitory computer-readable medium of claim 24, further comprising code for:

in response to determining that the second motion state is to be entered, determining whether the first motion state is to persist after the second motion state is entered;

in response to determining that the first motion state is not to persist, exiting the first motion state when the second motion state is entered; and in response to determining that the first motion state is to persist, 1) determining a persistence time period by which the first motion state is to persist after the second motion state is entered, and 2) delaying exiting the first motion state by the persistence time period after the second motion state is entered.

27. The non-transitory computer-readable medium of claim 26, wherein the first motion state is to persist when the first motion state indicates a user carrying the mobile device is walking or running, and the second motion state is a stationary state.

28. The non-transitory computer-readable medium of claim 26, wherein the first motion state is to persist when the first motion state indicates the mobile device is being carried in a moving motor vehicle or by a user who is biking, and the second motion state is a stationary state.

* * * * *